Aug. 20, 1929. L. H. WELLENSIEK 1,725,235
VALVE SUPPORT
Filed Sept. 23, 1926

Louis H. Wellensiek Inventor
By Jesse P. Stone
Attorney

Patented Aug. 20, 1929.

1,725,235

UNITED STATES PATENT OFFICE.

LOUIS H. WELLENSIEK, OF HOUSTON, TEXAS, ASSIGNOR TO HUGHES TOOL COMPANY, OF HOUSTON, TEXAS, A CORPORATION OF TEXAS.

VALVE SUPPORT.

Application filed September 23, 1926. Serial No. 137,326.

My invention relates to support for valves employed in well drilling operations. It is particularly designed for use on core drills where valves are employed, at the upper end of the core barrel to prevent washing of the core.

In drilling wells it is common practice to employ a float valve when the drill stem is introduced into the well. Said float valve is arranged in the drill stem to close upwardly and prevent the flow of the liquid in the well hole upwardly into the drill stem as the drill stem is lowered. The empty drill stem, when submerged, is buoyed up by the liquid in the hole. This has the effect of supporting some of the weight of the drill stem, and of preventing the necessity of supporting the full weight in the derrick. The float valve is so called because it assists in "floating" the drill stem into the hole.

It is an object of my invention to provide a valve and means to support said valve, which will enable the float valve to be used also in the core barrel of the drill where such a core barrel is used.

It is desired to support the valve resiliently so that it may be held from position upon the upper end of the core barrel, where it would close said barrel. The valve support holds the valve releasable, however, enabling the well to be washed before the drilling is started and the ball dropped to core barrel closing position.

The invention enables the valve to be used also as a float valve when desired, although it has important application in coring operations where a float valve is not used.

Figure 1:
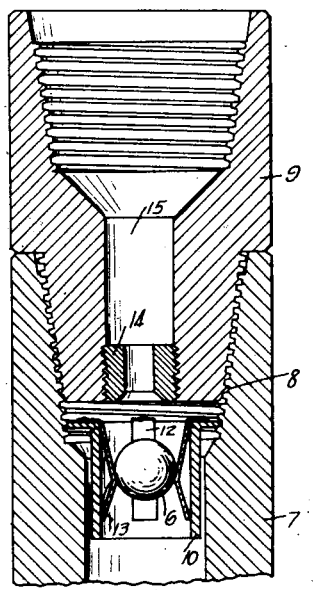
Figure 2:
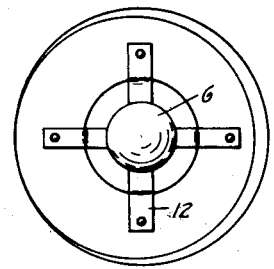
Figure 3:
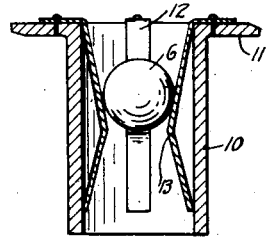

Referring to the drawing, Fig. 1 is a broken vertical section through a drill stem and illustrating the use of my invention on a core drill, and as a float valve. Fig. 2 is a top plan view of the valve support and Fig. 3 is a central vertical section through said support.

In Fig. 1 I have shown the upper end of the drill pipe section 1. There is a core barrel 2 therein, the upper end of which is screwed within the block 3 which closes said core barrel except for a central opening 4 the upper end of which is flared at 5 to provide a valve seat for the ball valve 6.

Where a float valve is used, it may be positioned at any desired distance above the drill. I have shown the float valve as formed within a tool joint as a housing. The lower box member 7 of the joint engages the pipe 1 at its lower end. The threaded box 8, for the pin member 9 above, also acts to receive the valve support.

Said support comprises a sleeve 10 having a radial flange 11 at its upper end the outer margin of which is beveled to allow it to screw into the lower threaded end of the socket or box 8. Flat spring plates 12 are secured upon the upper face of the flange 11. Said plates are extended downwardly within the sleeve and are bowed inwardly between their ends to form a resilient seat 13 for the ball valve 6. The said spring arms 12 engage the valve with a predetermined force to hold it from dropping, it being contemplated, however, that flushing fluid pumped downwardly with sufficient force will dislodge the valve, causing it to drop through the seat 13 and fall within the seat 5 of the core barrel.

When the valve is to act as a float valve also, a valve seat 14 is screwed within the passage 15 through the pin member 9 of the joint. The lower end of the valve seat is shaped to receive the valve 6 and said valve will therefore close the passage through the seat when the drill stem is submerged in the flushing fluid, while the drill is being introduced into the hole.

In the use of my device the parts will be assembled as shown in Fig. 1, and while the drill is being introduced into the hole, the valve 6 will close the passage of water through the tool joint at 15, thus permitting the drill stem to be floated into the hole. When the bottom of the hole is reached, the pump will be started to force water through the drill stem and drill to clean the same of mud and detritus. When the parts are cleaned, additional force upon the flushing fluid will force the valve 6 from the retaining springs 12 and the valve will then drop to close the core barrel and the water will find passage downwardly through the opening 16 at the side of the plug 3.

The device may be easily attached in any desired joint of the pipe with little modification and will make it possible to wash the core barrel and drill before a core is taken even when a float valve is desired.

Having thus described my invention, what I claim as new and desire to protect by Letters Patent is:

1. The combination with a core barrel having a valve seat at its upper end of a valve adapted to fit said seat and close said barrel, and means adapted to be rendered ineffective through fluid pressure to support said valve releasably above said seat.

2. The combination with a core barrel having an upwardly directed valve seat at its upper end, of a valve adapted to fit said seat, and resilient means to hold said valve from said seat with a predetermined pressure.

3. The combination with a core barrel having an upwardly directed valve seat at its upper end, of a valve and a means releasable by water pressure to hold said valve from said seat.

4. The combination of a drill stem, a core barrel therein having a valve seat at its upper end, a float valve seat in said drill stem above said core barrel, a valve, and means below said float valve seat to hold said valve releasably adjacent thereto, whereby said valve may close said float valve seat from passage of fluid upwardly therethrough, said valve being adapted to close said core barrel when released by said means.

5. The combination of a core barrel having a downwardly closing valve seat at its upper end, an upwardly closing float valve seat above said core barrel, a valve between said seats adapted to fit both of said seats and means to hold said valve releasably below said float valve seat.

6. The combination of a drill stem, a core barrel therein having an upwardly directed valve seat at its upper end, a valve above said seat, and releasable means to hold said valve from said seat comprising spring plates bowed inwardly to form a seat for said valve, and adapted to release said valve responsive to a predetermined fluid pressure from above.

In testimony whereof I hereunto affix my signature this 13 day of Sept. A. D. 1926.

LOUIS H. WELLENSIEK.